United States Patent [19]

Hurlburt

[11] Patent Number: 4,905,462
[45] Date of Patent: Mar. 6, 1990

[54] METHOD AND APPARATUS FOR MOUNTING AN IMPLEMENT TO A TRACTOR

[75] Inventor: Joseph C. Hurlburt, Lancaster, Pa.

[73] Assignee: Ford New Holland, Inc., New Holland, Pa.

[21] Appl. No.: 377,650

[22] Filed: Jul. 10, 1989

[51] Int. Cl.[4] ............................................. A01D 34/64
[52] U.S. Cl. ........................................ 56/15.9; 29/428; 56/DIG. 9
[58] Field of Search ............ 56/15.9, DIG. 7, DIG. 9, 56/DIG. 14, 218, 228; 29/428; 74/11; 180/388

[56] References Cited

U.S. PATENT DOCUMENTS

| | | | |
|---|---|---|---|
| 2,488,698 | 11/1949 | Acton | 56/15.9 X |
| 2,729,468 | 1/1956 | Hauswirth et al. | 56/DIG. 9 X |
| 3,403,802 | 10/1968 | Lundell | 56/DIG. 9 X |
| 4,059,171 | 11/1977 | Pakosh | 180/328 |
| 4,685,340 | 8/1987 | Shust et al. | 74/11 |
| 4,722,173 | 2/1988 | Covington et al. | 56/15.9 |

*Primary Examiner*—Thuy M. Bui
*Attorney, Agent, or Firm*—Larry W. Miller; Frank A. Seemar; Darrell F. Marquette

[57] ABSTRACT

A mechanism for mounting an implement to a tractor is disclosed wherein the implement is provided with an articulated frame pivotally movable through a hydraulic cylinder to position a pair of mounting arms in alignment with attachment brackets affixed to the prime mover. Each mounting arm is provided with a threaded member threadably engaged with the end thereof and extending outwardly therefrom for insertion through an opening in the attachment brackets. A detachable collar is secured onto the threaded member by a removable fastener positioned on the opposing side of the attachment brackets from the mounting arm. A rotation of the threaded members into the mounting arms causes engagement of the detachable collar with the attachment bracket to draw the mounting arms into engagement with the attachment brackets. Wedge members are affixed to the mounting arms and the attachment brackets to cam the mounting arms to effect alignment between the threaded members and the corresponding openings. The implement is secured on the tractor by engagement of the mounting arms with the attachment brackets and support members spaced forwardly therefrom and retained in position by engagement of the collars with the attachment brackets.

8 Claims, 4 Drawing Sheets

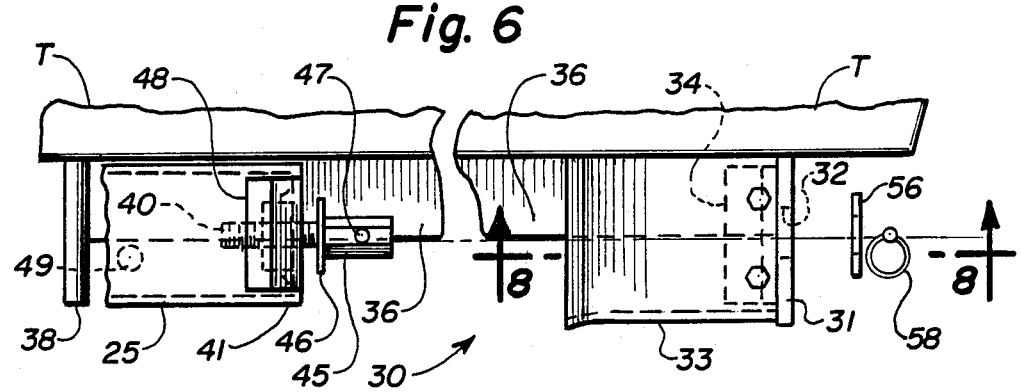
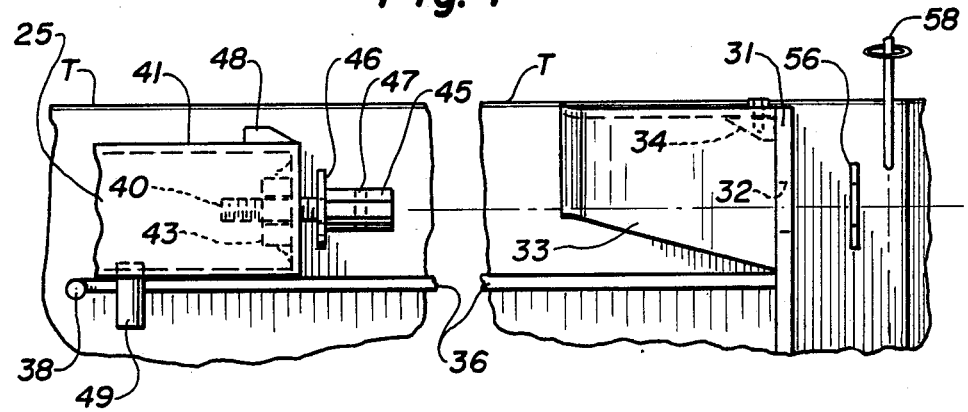
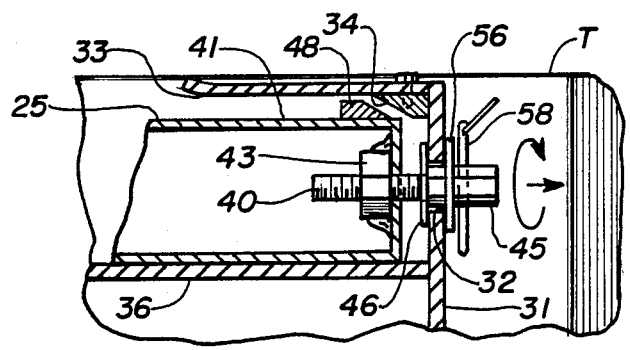
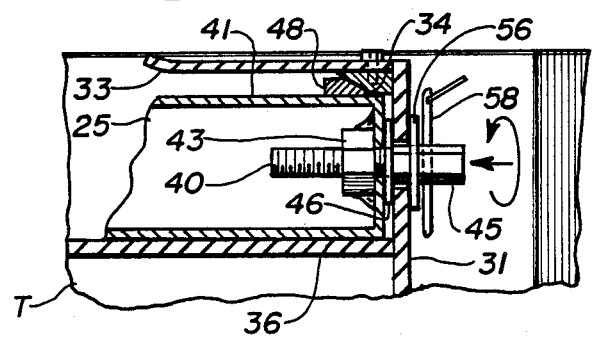

METHOD AND APPARATUS FOR MOUNTING AN IMPLEMENT TO A TRACTOR

BACKGROUND OF THE INVENTION

The present invention relates generally to implements mounted on a tractor for operational support thereof and, more particularly, to a mechanism for securing the mounting of the implement on the tractor.

Mounted harvesting implements, as opposed to pull-type harvesters which are connected to a tractor and towed behind, are affixed to and supported from the tractor to be pushed or pulled into the crop material to be harvested. With the advent of a hydraulically powered, articulated tractor, such as the Model 276 Bidirectional TM tractor manufactured by Ford New Holland, Inc., implements can be both mounted and towed for simultaneous operation.

Implements have been mounted on such tractors by the engagement of a pair of transversely spaced mounting arms with corresponding support members and attachment brackets affixed to a tractor. Retention of the mounting arms and supporting engagement with the support members and attachment brackets has been attained by a pin insertable through aligned holes in the mounting arms and attachment brackets, respectively. Alignment of these respective openings was sometimes difficult to achieve because of the failure to fully mount the implement on the tractor so that the mounting arms are fully engaged with the attachment brackets. As a result, the utilization of mounted implements on such tractors is hampered. Accordingly, it would be desirable to provide an improved mounting mechanism to facilitate the full engagement of a mounted implement on such a tractor.

SUMMARY OF THE INVENTION

It is an object of this invention to overcome the aforementioned disadvantages of the prior art by providing a mechanism for mounting an implement to a tractor that will draw the implement into proper engagement with the tractor.

It is another object of this invention to overcome the aforementioned disadvantages of the prior art by providing an improved method of mounting an implement to a prime mover.

It is still another object of this invention to provide a mounting mechanism to secure complete engagement of a mounted implement with the attachment brackets therefor.

It is a feature of this invention that a threaded member and detachable collar engageable with the attachment bracket are utilized to draw the mounted implement into complete engagement with the attachment brackets.

It is an advantage of this invention that the final engagement of the implement with the attachment brackets securing the mounting of the implement to the tractor can be attained without requiring movement of the tractor.

It is another advantage of this invention that a systematic method of mounting an implement to a tractor can be followed repetitively to assure a complete mounting of the implement to the tractor.

It is another feature of this invention that proper alignment of the mounting arm of the implement with the respective attachment brackets on the tractor can be effected through wedge members to cam the mounting arms into proper alignment.

It is still another feature of this invention that the threaded member engaged with each respective mounting arm on the implement carries a collar positioned between the mounting arm and the associated attachment bracket to provide a means for pushing the implement out of engagement with the attachment bracket through a counterrotation of the threaded member.

It is yet another feature of this invention to provide a stop member on each mounting arm engageable with a support member on the tractor to indicate sufficient movement of the tractor relative to the implement for the dismounting of the implement from the tractor.

It is a further object of this invention to provide a mechanism for mounting an implement to a prime mover which is durable in construction, inexpensive of manufacture, carefree of maintenance, facile in assemblage, and simple and effective in use.

These and other objects, features, and advantages are accomplished according to the instant invention by providing a mechanism for mounting an implement to a tractor wherein the implement is provided with an articulated frame pivotally movable through a hydraulic cylinder to position a pair of mounting arms in alignment with attachment brackets affixed to the prime mover. Each mounting arm is provided with a threaded member threadably engaged with the end thereof and extending outwardly therefrom for insertion through an opening in the attachment brackets. A detachable collar is secured onto the threaded member by a removable fastener positioned on the opposing side of the attachment brackets from the mounting arm. A rotation of the threaded members into the mounting arms causes engagement of the detachable collar with the attachment bracket to draw the mounting arms into engagement with the attachment brackets. Wedge members are affixed to the mounting arms and the attachment brackets to cam the mounting arms to effect alignment between the threaded members and the corresponding openings. The implement is secured on the tractor by engagement of the mounting arms with the attachment brackets and support members spaced forwardly therefrom and retained in position by engagement of the collars with the attachment brackets.

BRIEF DESCRIPTION OF THE DRAWINGS

The advantages of this invention will become apparent upon consideration of the following detailed disclosure of the invention, especially when taken in conjunction with the accompanying drawings wherein:

FIG. 6 is an enlarged schematic view of the end of one of the mounting arms of the implement frame prior to engagement with the associated attachment bracket corresponding to lines 6—6 of FIG. 5, the detachable collar and fastener being shown in exploded form for engagement with the threaded member on the opposing side of the attachment bracket;

FIG. 7 is a schematic side elevational view of the mechanism shown in FIG. 6;

FIG. 8 is a schematic cross-sectional view of the mechanism corresponding to lines 8—8 of FIG. 6 to show a side elevational view of the threaded member inserted through the corresponding opening in the attachment bracket and with the detachable collar and removable fastener affixed to the threaded member so that a subsequent rotation of said threaded member will fully engage the mounting arm with the attachment bracket; and FIG. 9 is a schematic cross-sectional view similar to that of FIG. 8 showing the mounting arm being drawn into full engagement with the attachment bracket such that a subsequent counterrotation of the threaded member will effect an initiation of the dismounting of the implement from the tractor.

DETAILED DESCRIPTION OF THE PREFERRED EMBODIMENT

Figure 1:
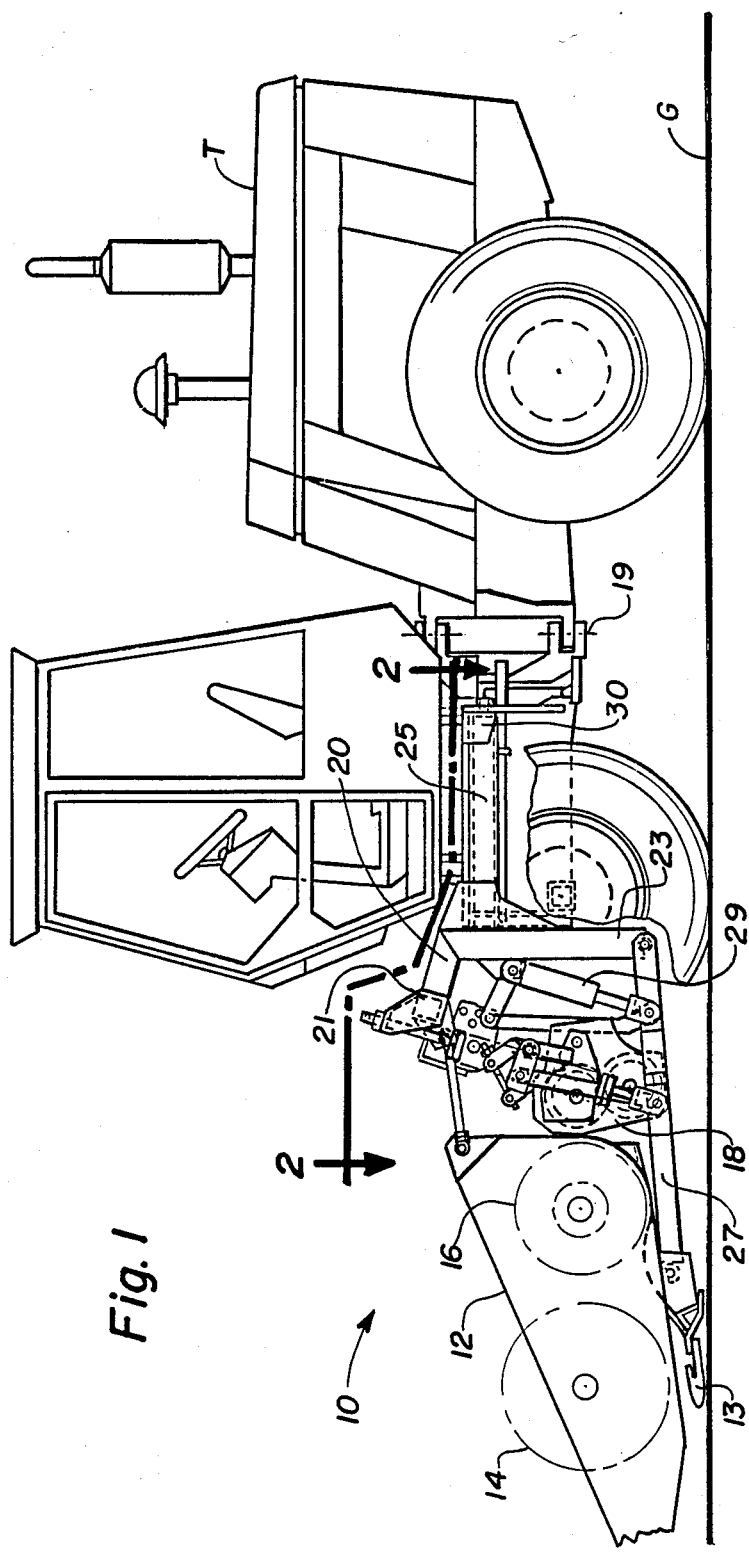
FIG. 1 is a side elevational view of a crop harvesting machine mounted on a tractor, the crop harvesting machine including a crop gathering header and a rearwardly positioned conditioning mechanism all supported from an implement frame incorporating the principles of the instant invention, portions of the tractor and crop gathering header being broken away for purposes of clarity.
Figure 2:
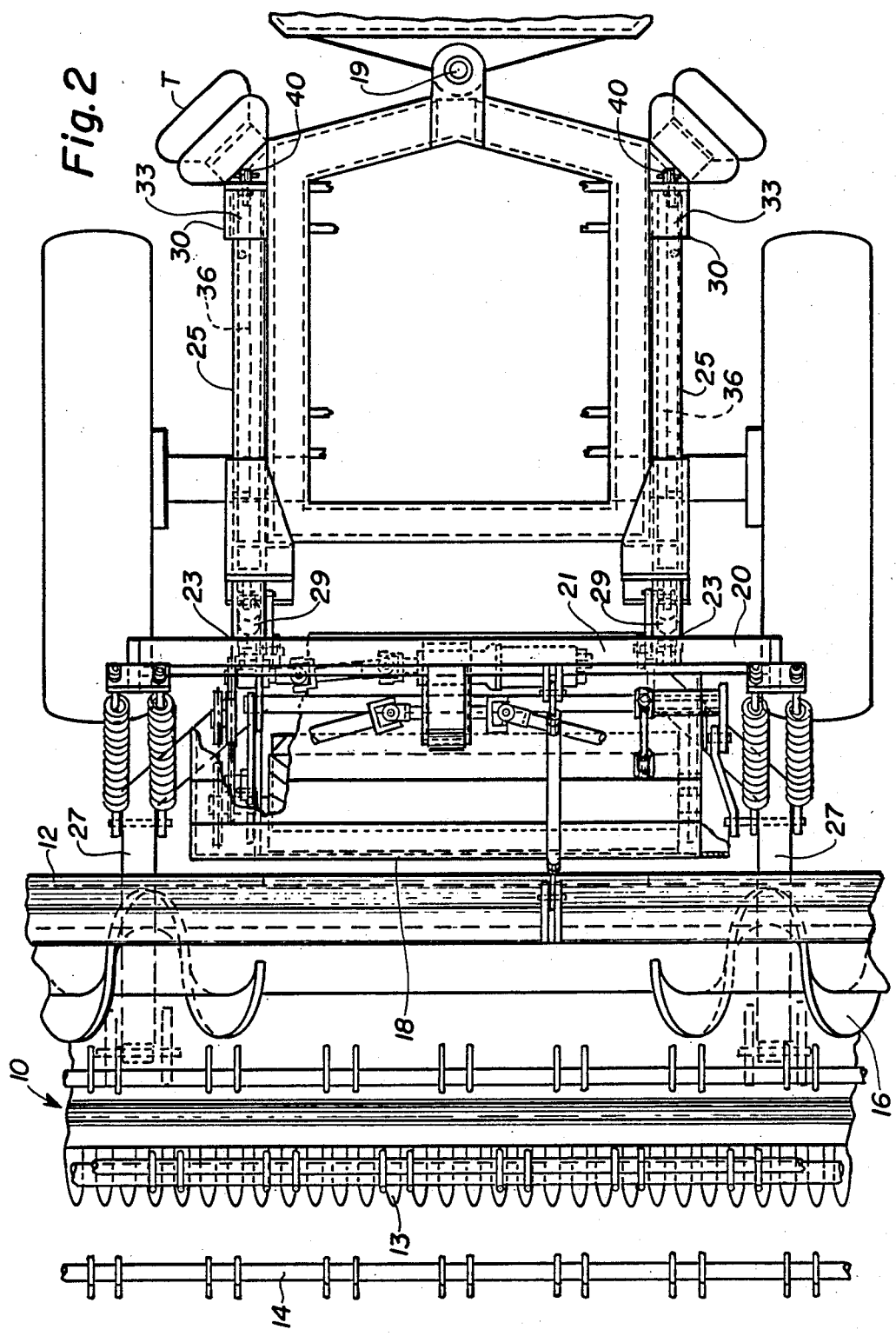
FIG. 2 is a cross-sectional view of the implement mounted to the tractor taken along lines 2—2 of FIG. 1, a major portion of the tractor and crop gathering header being broken away to facilitate a viewing of the implement frame.

Referring now to the drawings and, particularly, to FIGS. 1 and 2, side elevational and top plan views of a crop harvesting machine, attached to a prime mover, such as a tractor, incorporating the principles of the instant invention, can best be seen. Any left and right references are used as a matter of convenience and are determined by standing at the rear of the tractor, facing the forward end, the direction of travel. Although the drawings depict the deployment of the crop harvesting machine as the implement to be mounted on a tractor, one skilled in the art will readily realize that the principles of the instant invention will be equally applicable to any implement to be mounted on a tractor for operation in conjunction therewith.

The crop harvesting machine 10 is of the type to be mounted on the forward end of tractor T to be pushed into the crop material to be harvested. The crop harvesting machine 10 includes a crop gathering header 12 which includes a conventional reciprocating cutterbar 13 to sever standing crop material from the ground G, a rotating reel 14 to convey the severed crop material over the cutterbar 13 and rearwardly therefrom in a conventional manner, and an auger 16 transversely extending along the rear of the crop gathering header 12 to receive severed crop material from the reel 14, converge the crop material and discharge it toward the rearwardly positioned conditioning mechanism 18. The crop gathering header 12 and conditioning mechanism 18 are mounted on an implement frame 20 adapted to be detachably connected to the tractor T.

The tractor T is shown in the drawings as being of the type described in greater detail in U.S. Pat. No. 4,059,171 and in U.S. Pat. No. 4,685,340, and marketed by Ford New Holland, Inc. as the Model 276 Bidirectional TM tractor. Although this tractor T is hydrostatically driven and steered through manipulation of the articulation joint 19, one skilled in the art will readily realize the principles of the instant invention are not limited by the type of tractor serving as the prime mover; however, the principles of the instant invention do relate to the mounting of an implement directly to the tractor T rather than through a 3-point hitch mechanism utilized on some tractors.

The implement frame 20 includes a main transverse beam 21 and a pair of transversely spaced, downwardly depending legs 23. A mounting arm 25 projects rearwardly (relative to the forwardly positioned header 12) from each downwardly depending leg 23. A pair of transversely spaced lift arms 27 are pivotally connected to respective downwardly depending legs 23 and extend forwardly therefrom for support of the header 12. The pivotal movement of the lift arms 27 relative to the legs 23 is controlled by a hydraulic cylinder 29 interconnecting each lift arm 27 and the corresponding leg 23 such that extension and retraction of the hydraulic cylinder 29 pivotally moves the lift arms 27 for generally vertical movement of the header 12 mounted thereon. The hydraulic cylinders 29 are detachable connectable to a supply of hydraulic fluid under pressure carried by the tractor T in a conventional manner.

The tractor T is provided with a pair of attachment brackets 30 positioned on opposite sides of the tractor T, as shown in FIG. 2, for engagement with the mounting arms 25 to mount the implement 10 on the tractor T. As best seen in FIGS. 6–9, each attachment bracket 30 includes a vertical rearward member 31 having an opening 32 extending horizontally therethrough and a horizontally extending upper cap member 33 having a detachable wedge member 34 affixed thereto on the underside thereof. The attachment bracket 30 also includes a longitudinally extending horizontal shelf 36 positioned below the cap member 33 and extending forwardly from the rearward member 31 for termination in a transversely projecting support member 38 shown in the form of a dowel.

The mounting arms 25 are provided at the rearward end 41 thereof with a threaded member 40 threadably received within a nut 43 welded to the interior of the rearward end 41 of the mounting arms 25. The threaded members 40 terminate in a rearwardly extending hexagonal head 45 adapted for engagement with a wrench to effect rotation thereof relative to the mounting arm 25. The head 45 is formed with an integral first collar 46 positioned adjacent the end 41 of the mounting arm 25 and with a hole 47 extending therethrough at a location spaced rearwardly of the first collar 46. The rearward end 41 of the mounting arms 25 is also provided with a wedge member 48 positioned on the uppermost surface thereof for engagement with the wedge member 34 affixed to the upper cap member 33 of the attachment bracket 30. Each mounting arm 25 is also provided with a downwardly depending stop 49 positioned proximate to the end 41 for engagement with the transversely extending support dowel 38 in a manner further described below. The threaded member 40 is also provided with a detachable second collar 56 which is retainable on the head 45 of the threaded member 40 by a removable fastener 58, such as a "klik pin", extending through the hole 47.

Figure 3:
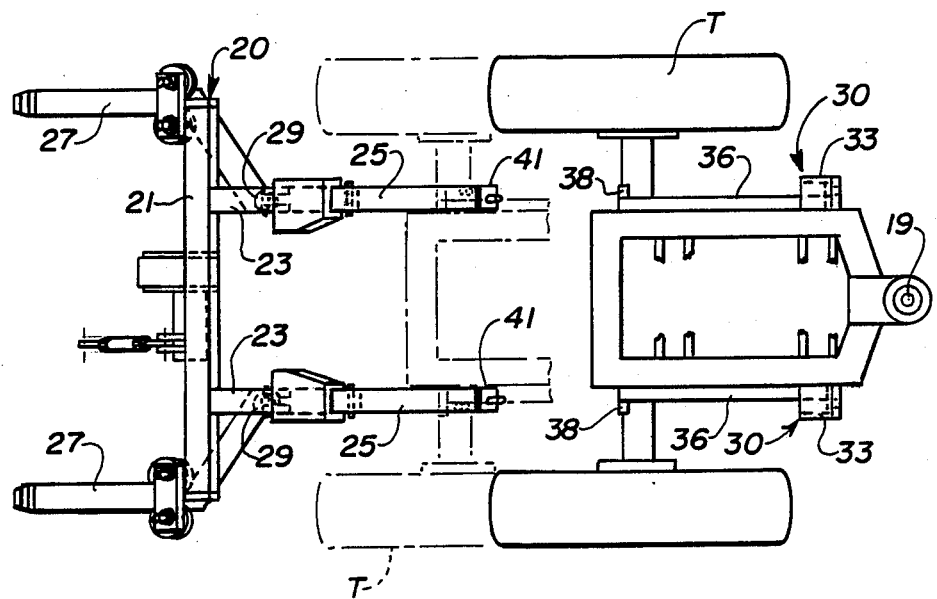
FIG. 3 is a schematic top plan view of the forward portion of the tractor and the implement frame with the header removed therefrom prior to being mounted on the tractor, the movement of the tractor for initial positioning thereof relative to the implement frame being shown in phantom.
Figure 4:
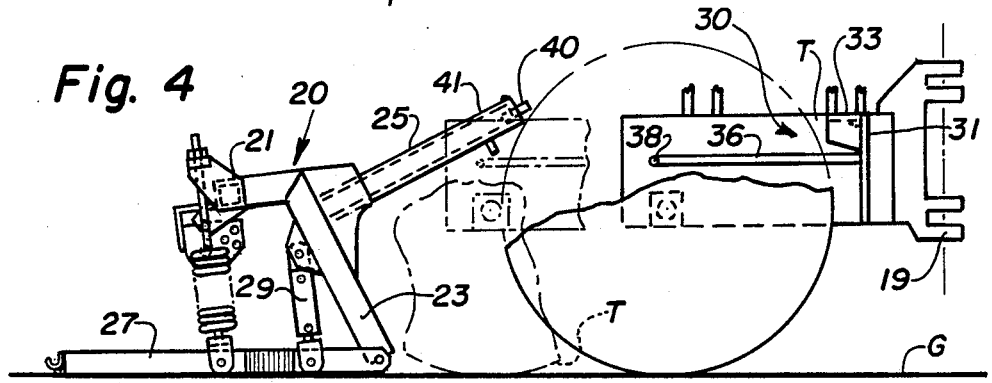
FIG. 4 is a schematic side elevational view of the tractor and implement shown in FIG. 3, the movement of the tractor for initial positioning of the tractor relative to the implement frame being shown in phantom.
Figure 5:
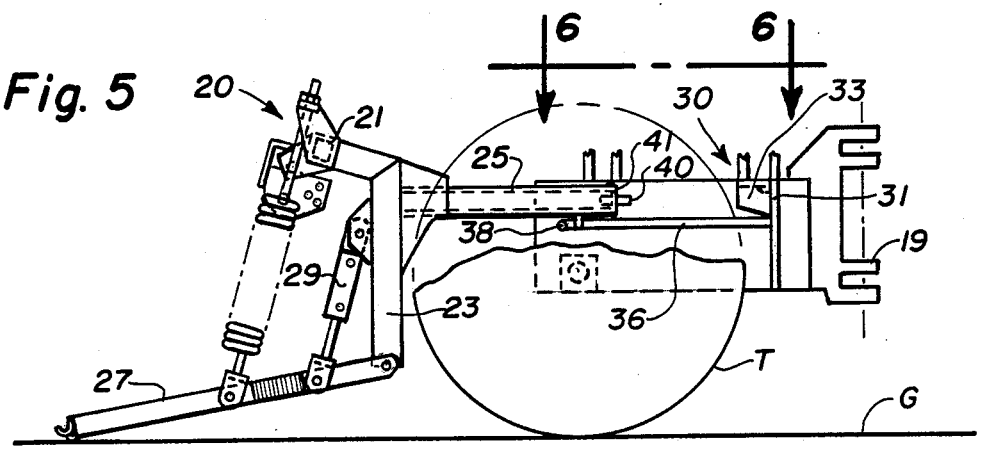
FIG. 5 is a schematic side elevational view similar to that of FIG. 4 showing the engagement of the implement frame with the support member on the tractor prior to moving the tractor forwardly into engagement with the implement frame.

The operation for the mounting of the implement 10 on the tractor T can best be seen in FIGS. 3-9. The implement 10 is stored in the position depicted in FIGS. 3 and 4 with the hydraulic cylinder 29 completely retracted to collapse the articulation between the lift arms 27 and the downwardly depending legs 23, thereby resulting in the non-horizontal orientation of the mounting arms 25 extending upwardly and rearwardly from the legs 23. The implement 10 is supported by the lift arms 27 resting upon the ground G when in the stored position. A positioning of the tractor T proximate to the implement frame 20 so that the transversely extending support dowel 38 is located forwardly of the downwardly depending stop member 49 on the mounting arms 25 is depicted in phantom in FIGS. 3 and 4. After this initial positioning of the tractor T, the hydraulic cylinder 29 is operatively connected to the supply of hydraulic fluid under pressure carried by the tractor T to effect an extension of the hydraulic cylinder 29 as depicted in FIG. 5, effecting a pivotal movement of the lift arms 27 relative to the legs 23 until the mounting arms 25 reach a generally horizontal position. At this point, the implement frame 20 is supported on the ground G by the lift arms 27 and on the tractor T by the support dowel 38 and perhaps a portion of the shelf member 36.

Referring now to FIGS. 6-9, it can be seen that a subsequent movement of the tractor T toward the implement frame 20 causes a movement of the attachment brackets toward the mounting arms 25. The curved shape to the upper cap member 33 and engagement of the wedge member 34 carried by the upper cap member 33 with the wedge member 48 carried by the mounting arm 25 drives the mounting arm 25 into alignment with the attachment bracket 30 so that the head 45 of the threaded member 40 passes through the opening 32 in the vertical rearward member 31 of the attachment bracket 30. Should be operator move the tractor T too far forwardly, the first collar 46 carried by the head 45 will engage the rearward member 31 and cause the implement frame 20 to move forwardly, thereby signaling the operator to stop the forward movement of the tractor T.

A subsequent positioning of the second collar 56 on the head 45 of the threaded member 40 on the opposing side of the rearward member 31 of the attachment bracket 30 from the first collar 46 and the insertion of the removable fastener 58, shown in FIGS. 6-9 as a "klik pin", to retain the second collar 56 on the threaded member 40, places the threaded member 40 in condition for drawing the implement frame 20 into a fully mounted position. A rotation of the threaded member, typically effected by the engagement of a wrench with the hexagonal head 45, to rotate the threaded member 40 into the end 41 of the mounting arm 25 draws the mounting arm 25 rearwardly toward the vertical rearward member 31 due to the inability of the second collar 56 to pass through the opening 32 in the rearward member 31. Once the mounting arms 25 have been drawn tightly against the attachment bracket 30, the implement 10 is firmly mounted on the tractor T.

A dismounting of the implement 10 from the tractor T is effected in reverse sequence to that described above for the mounting thereof. If needed, a counterrotation of the threaded member 40, as depicted in FIG. 9 to withdrawn the threaded member 40 from the end 41 of the mounting arm 25 pushes the mounting arm 25 away from the vertical rearward member 31 due to the inability of the first collar 46 to pass through the opening 32, thereby breaking the mounting arm 25 and its wedge member 48 free from the attachment bracket 50 and its wedge member 34. A removal of the fastener 58 and the second collar 56 from the head 45 of the threaded member 40 will permit the operator to back the tractor T away from the implement frame 20 until the support dowel 38 engages the downwardly depending stop member 49, signaling the operator through a slight movement of the implement 10 that rearward motion of the tractor T can be halted. A subsequent contraction of the hydraulic cylinder 29 to return the frame to its stored position as depicted in FIGS. 3 and 4, and a subsequent disconnection of the hydraulic cylinder 29 from the power supply carried by the tractor T completes the dismounting of the implement 10 from the tractor T.

One skilled in the art will readily realize that the method and apparatus for mounting an implement 10 to the tractor T as described above will permit the implement 10 to be completely mounted on the tractor T and fully supported by the attachment brackets 30 for proper operation of the implement 10. Accordingly, the mounting of the implement 10 on the tractor T can be effected in a systematic and consistent manner resulting in a complete mounting thereof quickly and easily each time a mounting of the implement 10 on the tractor T is desired. The use of the threaded member 40 in the cam action of the wedge members 34, 48 accommodate any minor misalignment between the implement frame 20 and the attachment brackets 30. One skilled in the art will readily realize that a positioning of the wedge members 34, 48 other than that depicted in FIGS. 6-9 will effect a positioning of the mounting arm 25 as desired. For example, an adjustable mounting of the wedge member 34 on the upper cap member 33 to position the wedge member 34 forwardly of the vertical rearward member 31 sufficiently to engage the wedge member 48 on the mounting arm 25 prior to alignment of the threaded member 40 with the opening 32 will assure that the head 45 of the threaded member 40 passes through the opening 32 even if the initial alignment of the mounting arms 25 are slightly askewed.

It will be understood that changes in the details, materials, steps, and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts as based upon the description may be employed in other embodiments without departing from the scope of the invention. Accordingly, the following claims are intended to protect the invention broadly as well as in the specific form shown.

Having thus described the invention, what is claimed is:

1. In an implement mountable on a prime mover having a pair of spaced apart attachment brackets affixed thereto, each said attachment bracket having an opening extending therethrough, said implement having a pair of fore-and-aft extending mounting arms corresponding to said attachment brackets and engageable therewith when said implement is operably mounted on said prime mover, the improvement comprising:

a threaded member threadably received in each said mounting arm and insertable through the corresponding said opening in said attachment brackets, said threaded member having a head which is projectable through the corresponding said opening and a first collar having a diameter larger than the corresponding said opening and engageable with the corresponding said attachment bracket when said head is projected through said corresponding opening, said threaded member having a detachable second collar mountable on said head and engageable with the corresponding said attachment bracket on the opposing side thereof from said first collar, the selective rotation of each said threaded member causing relative movement between the corresponding said mounting arm and the associated attachment bracket.

2. The implement of claim 1 wherein each said second collar is retained on the corresponding head by a removable fastener.

3. The implement of claim 2 wherein said threaded members are axially aligned with the corresponding mounting arms.

4. The implement of claim 3 wherein said fastener is a pin insertable through the head of said threaded member to prevent said second collar from disengaging said head.

5. A method of mounting an implement to a prime mover having a pair of transversely spaced attachment brackets with an opening extending therethrough, said implement having a frame; a pair of mounting arms; and at least one articulated lift arm, including an extension means interconnecting said frame and said at least one lift arm to effect a relative pivotal movement between said at least one lift arm and said frame, said extension means being selectively connectable to a power supply for selectively controlling the pivotal movement of said at least one lift arm, each said mounting arm having a threaded member threadably engaged with said mounting arm and extending outwardly therefrom in axial alignment therewith, said threaded member terminating in a head having a first collar affixed thereto, said first collar having a size dimension greater than said opening in said attachment bracket, while said head has a size dimension sufficiently small to be insertable through said opening, comprising the steps of:

positioning said prime mover adjacent to said implement such that said mounting arms are generally aligned with said attachment brackets;

connecting said extension means to said power supply;

then extending said extension means to effect relative pivotal movement between said at least one lift arm and said frame until said mounting arms are in general alignment with said attachment brackets;

then moving said prime mover toward said implement until the heads of said threaded member are inserted into the openings in the corresponding said attachment brackets with said first collars being positioned on one side of said attachment brackets between said implement and said attachment brackets;

then placing a second collar on each said head on the opposing side of the corresponding said attachment bracket from the corresponding said first collar and retaining said second collars on the corresponding head by a removable fastener;

then rotating said heads to thread said threaded member into the corresponding said mounting arm until said second collars engage the corresponding said attachment brackets; and then further rotating said threaded members into the corresponding said mounting arms to draw said mounting arms into full engagement with said attachment brackets.

6. The method of claim 5 further comprising the step of:

camming said mounting arms against said attachment brackets through the engagement of respective wedge members on said mounting arms and said attachment brackets to effect alignment of said threaded member heads with the openings in the corresponding said attachment brackets.

7. The method of claim 6 wherein said extending step further comprises the step of supporting said mounting arms on support members affixed to said prime mover in spaced relationship relative to said attachment brackets.

8. The method of claim 7 wherein the dismounting of said implement from said prime mover is initiated by the counterrotating of said threaded members to extract said threaded members from the corresponding mounting arms until said first collars engage the corresponding said attachment brackets and then a further counterrotating of said threaded members to push said mounting arms away from said attachment brackets.

* * * * *